United States Patent [19]

Jonell

[11] 4,332,301
[45] Jun. 1, 1982

[54] METHOD AND A MACHINE OF OBTAINING SAMPLES FROM THE GROUND TO DETERMINE ITS COMPOSITION

[76] Inventor: Per-Olof Jonell, Engelbrektsgatan 24, S-411 37 Göteborg, Sweden

[21] Appl. No.: 142,409

[22] Filed: Apr. 21, 1980

[30] Foreign Application Priority Data

Apr. 27, 1979 [SE] Sweden ............................. 7903737

[51] Int. Cl.³ ............................................. E21B 44/00
[52] U.S. Cl. ........................................ 175/50; 175/58; 175/206; 73/864
[58] Field of Search ...................... 175/50, 60, 206, 58; 73/421 B, 421 R

[56] References Cited

U.S. PATENT DOCUMENTS

| | | | |
|---|---|---|---|
| 2,167,393 | 7/1939 | Muncy | 175/60 |
| 2,302,996 | 11/1942 | Lilligran | 73/421 R |
| 2,452,515 | 10/1948 | Athy | 175/50 |
| 2,882,014 | 4/1959 | Addison | 73/421 R |
| 3,291,229 | 12/1966 | Houston | 175/60 |
| 3,333,391 | 8/1967 | Horeth et al. | 73/421 R |
| 3,675,488 | 7/1972 | Viktora et al. | 73/421 R |
| 3,887,020 | 6/1975 | Chaffin | 175/60 |

FOREIGN PATENT DOCUMENTS 1155672  5/1958  France ............................. 175/60

*Primary Examiner*—William F. Pate, III
*Attorney, Agent, or Firm*—Harness, Dickey & Pierce

[57] ABSTRACT

A method and a machine for obtaining of samples from the ground to determine the presence of certain substances in the ground. A drilling machine drives a drill down into the section of the ground to be prospected and cooling air is forced through the drill bit and down into the drill hole during the drilling. At least a part of the dust-laden air which escapes from the drill hole during the drilling is induced to pass through a filter web which is advanced continuously at a rate proportional to the drilling rate. When dust particles deposited on the web are analyzed, it becomes possible to determine what kind of minerals and other substances are contained in the prospected section of the ground and from which level they originate.

4 Claims, 5 Drawing Figures

METHOD AND A MACHINE OF OBTAINING SAMPLES FROM THE GROUND TO DETERMINE ITS COMPOSITION

BACKGROUND OF THE INVENTION

In land development projects, it is often desirable to take samples to determine whether certain minerals or other valuable substances are present in the ground. To effect such sampling, drilling machines are commonly used by means of which tubes are driven into the ground such that a core of the ground material may be lifted to ground level to be examined. Drilling machines of this kind are expensive, and also heavy and difficult to transport over rough ground. In addition, the very driving of the steel tube into the ground is time-consuming, which makes the entire prospecting work quite expensive. Furthermore, often a large number of sampling cores of considerable length must be lifted up from the ground without containing any of the substances one hopes to find.

From e.g. the Swiss Patent Specification No. 356 426 is already known a machine comprising a percussion drill which is driven by pressurized air and designed to drive down a drill which is cooled by compressed air, into the section of the ground that is to be prospected. The machine comprises a hood arranged to be applied over the upper end of the drill hole and a pipe connects the hood to a suction fan. A filter is arranged in the pipe and at least a portion of the dust-laden air ascending up the drill hole and collected in the hood is forced to pass through this filter.

The publication is simply concerned with the problems involved in collecting the drill cuttings entrained in the air leaving the drill hole for the purpose of preventing the cuttings from polluting the air around the working area. In order not to overload the centrifugal purification equipment incorporated in the plant a pre-purification unit is arranged in the exhaust pipe. The primary object of this publication thus is to provide a plant that does not pollute the environment.

SUMMARY OF THE INVENTION

In contrast to this prior-art publication, the subject invention is concerned with facilitating the sampling and prospecting work involved in determining whether certain minerals or other valuable substances exist in selected sections of the ground. For this purpose, the machine in accordance with the invention is characterized in that it comprises a filter in the form of a web which is driven continuously during the drilling operation so as to be induced to pass over an exhaust aperture of the exit pipe leading to the suction fan, and in that it comprises means arranged to drive the filter web at a speed which is proportional to the drilling rate.

The subject invention provides the advantage not only of making it possible to determine the composition of the prospected section of the ground by analysis of the particles deposited on the filter web but also to determine at what level these particles are collected. By drilling a number of holes spaced suitable distances apart it thus becomes possible to survey the entire area and to determine the presence of valuable minerals as well as at which depth they can be found. In this manner information is provided on which to base evaluation regarding the profitability of the development of a particular land area.

Another purpose of the subject invention is to make the prospecting work considerably easier and less expensive in that the drilling equipment does not require steel tubes but uses conventional rock drills fitted with an air-cooled drill bit. Considerably lighter and less complicated drilling equipment is required to drive drills of this kind down into the ground. With the aid of the machine in accordance with the invention it is also possible to obtain at least a preliminary picture of the composition of the prospected section of the ground comparatively rapidly and at considerably lower costs than with the aid of machines requiring that very long cores of material be drilled and lifted to ground level.

In accordance with one embodiment of the invention the pipe leading to the filter web is equipped with a pre-separation unit which may be of a kind known per se. The pre-separation unit separates coarse drill cuttings from the finer dust particles, thus ensuring that only the finer dust particles ascending up the drill hole settle on the filter web. Occasionally, the coarser drill cutting might momentarily adhere to the inner face of the drill hole and form clusters which from time to time come loose and are entrained upwards to the pre-separation unit. The dust particles, on the other hand, are carried continuously to the filter web, entrained in the flow of air. This ensures that on the continuously advanced filter web actually are deposited particles, that continuously leave the very drilling point and are not stopped on their way. The filter web is driven at a speed which is proportional to the drilling rate. This ensures that the particles on the filter web, which are analyzed later, actually originate from a well defined level in the ground.

The invention likewise concerns a method of using the machine. The method is characterized by the steps of inducing at least a part of the air which during the drilling ascends up the drilling hole and which is laden with dust and drill cuttings, to pass through a filter web by advancing said web at a speed that is proportional to the drilling rate, whereby is ensured that dust particles are deposited on said filter web, and by analyzing said particles to determine the composition of the ground.

BRIEF DESCRIPTION OF THE DRAWINGS

The invention will be described in closer detail in the following with reference to the accompanying drawings, wherein.

DETAILED DESCRIPTION OF A PREFERRED EMBODIMENT

Figure 1:
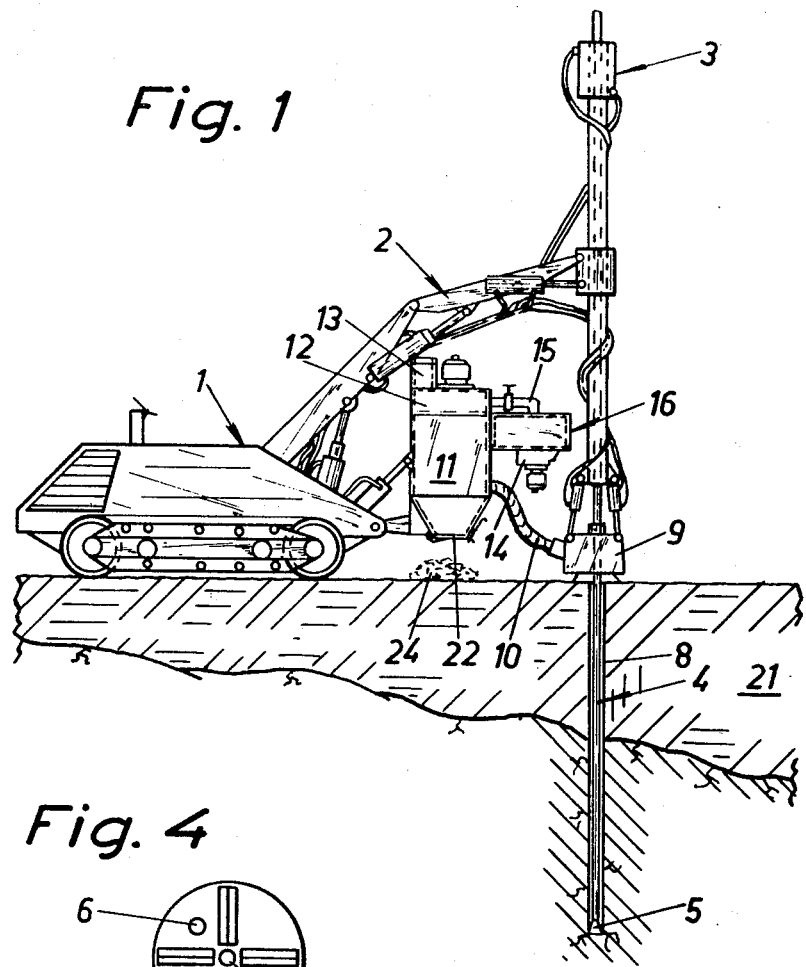
FIG. 1 is a lateral view of a cross-country vehicle equipped with a drilling machine in accordance with the invention, in operation.
Figure 4:
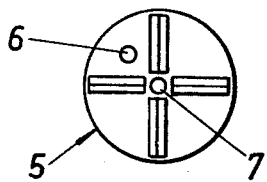
FIG. 4 is an end view of a drill bit used for drilling purposes with the machine in accordance with the invention.

The vehicle illustrated in FIG. 1 is equipped with a crane 2 which is driven either hydraulically or pneumatically and which supports a percussion-drill machine 3 which is provided with a rock drill 4. The drill bit 5 (FIG. 4) of the latter is cooled with pressurized air from channels 6, 7 extending lengthwise in the drill bit in communication with a compressor (not shown).

The vehicle 1 is also provided with a hood 9 which is arranged to be applied at the upper end of the drill hole 8 made by the drill 4, and a flexible line 10 connects the hood 9 with a separator means, preferably a cyclone separator 11 at the upper part of which is arranged a suction fan 12. The major portion of the transport air is evacuated through an outlet 13. A second fan 14 evacuates some of the transport air through a pipe 15 leading to a filter housing 16. A filter 18 in the form of a web is unwound from a roller 19 onto a rotatably driven drum 20 so as to pass in front of the lower end 17 of the pipe 15.

When the drilling machine 3 drives the drill 4 down into the ground 21, the soil or ground material is broken up into smaller fragments known as drill cuttings and comprising more or less coarse particles as well as dust. The pressurized air, supplied from the channels 6, 7 formed in the drill bit 5, drives the dust containing particles of various fineness, up through the drill hole 8. The dust is collected in the hood 9 and from there the stream of air is sucked by the fan 12 through the cyclone separator 11 and escapes through the outlet 13. The coarser particles fall down to the lower end of the cyclone separator 11, from where they may be removed via a bottom outlet 22. Some of the transport air is sucked by the fan 14 through the pipe 15 so as to pass through the filter 18 on which the dustlike solid particles 23, having been separated from the transport air, are desposited.

The entire filter web 18, or if desired, only pieces thereof can be withdrawn from the filter housing 16 at preferably regular intervals for analysis of the separated particles. Spectrum analysis or chemical analysis show which minerals or other valuable substances that the drill 4 has penetrated through.

Also the particles 24 removed via the bottom outlet 22 may be submitted to similar analysis.

Figure 5:
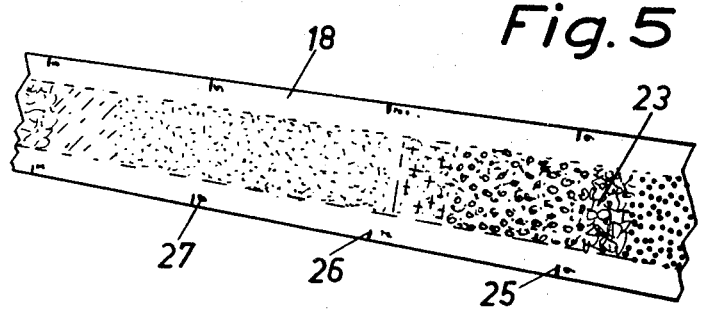
FIG. 5 is a plan view of a piece of a filter web with particles collected thereon.
Figure 2:
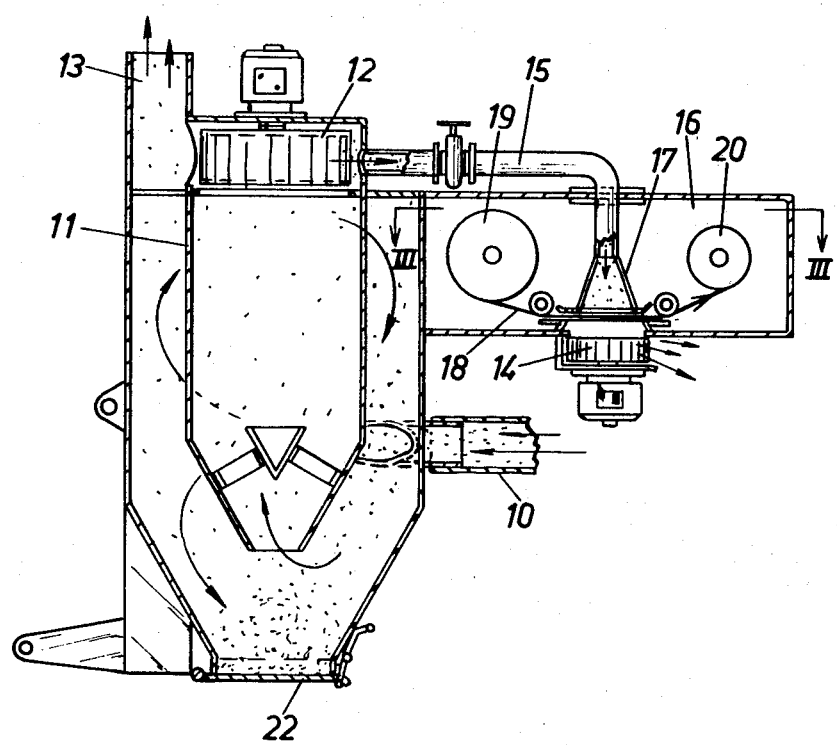
FIG. 2 illustrates on an enlarged scale a vertical section through an equipment in accordance with the invention, pertaining to said drilling machine.
Figure 3:
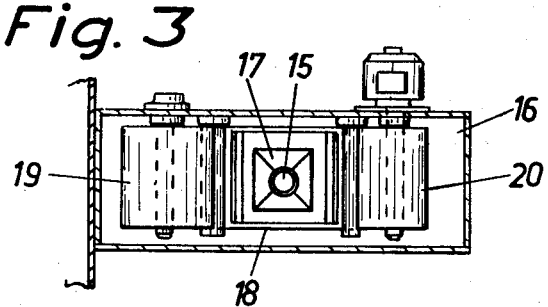
FIG. 3 is a horizontal transverse sectional view along line III—III of FIG. 2.

In order to determine at which level certain desirable substances are to be found the advancement of the filter web 18 with the aid of the drum 20 is effected in a manner so as to ensure that the rate of filter advancement is directly proportional to the drilling rate of the drill 4. This permits readings to be taken directly from the filter web 18, on which are made index marks 25, 26, 27, (FIG. 5) which are representative of different depths. In this manner, it is easy to determine from which level the particles 23 on the filter originate.

It should be noted that during the drilling operation, the drill cuttings, that is the coarser particles which the pressurized air supplied through the channels 6 and 7 forces up through the drill hole 8, sometimes have a tendency to adhere temporarily to the drill hole wall, particularly when the drill hole is moist. These coarser particles form clusters which due to the increasing air pressure in the drill hole are pressed upwards, out of the drill hole. Fine-particle dust, on the other hand, that is formed by the drill bit 5 during drilling, is continuously entrained upwards in the air stream along the drill hole 8 and at least some of the particles of that dust will continuously deposit on the filter 18. In this manner is ensured that in the subsequent analysis of the particles that have deposited on the continuously advanced filter web, it is possible to determine with certainty from which level in the ground the particles 23 in question originate.

Instead of a filter 18 in web form separate filter sheets could be used. Such separate filter sheets may be supplied from a stack of such sheets and one by one be applied on a continuously advanced, preferably endless net web. This makes it possible to withdraw from the filter housing 16 for instance each third, fourth or fifth filter sheet, as desired, for analysing purposes.

The embodiment as described and illustrated is to be regarded as one example only and particularly the structure and design of the filter could be varied in several ways within the scope of the invention. The separator 11 could be dispensed with entirely and the flexible line 10 be connected directly to the filter housing 16. If desired, the suction fan 14 may be arranged above the filter, ensuring that the dust particles pass through the fan and are than forced through the filter under pressure.

The cooling air through the drill bit 5 could be admixed with water preferably in atomized form.

What I claim is:

1. An improved method of obtaining samples from the ground to determine the presence therein of certain substances, during a drilling operation comprising driving a drill bit by means of a drilling machine into the section of the ground to be prospected, and forcing cooling air through the drill bit down into the drill hole during the drilling operation, the improvement comprising the steps of collecting the air and entrained duct and drill cuttings escaping from the drill hole passing through a filter web at least a portion of the collected air and entrained dust and drill cuttings during the drilling operation, to remove at least a portion of the entrained particles from the collected air, advancing said filter web continuously at a rate which is proportional to the drilling rate so that the removed particles will be segregated into areas relative to the depth from which they are taken, and analysing dust particles collected on said filter web.

2. A machine for performing a ground sampling method to determine the presence in the ground of certain substances, by driving a drill by means of a drilling machine into the section of the ground to be prospected, said machine comprising a percussion drilling machine an air-cooled drill bit driven by said percussion drilling machine into the section of the ground to be prospected, a hood arranged to be applied over the upper end of the drill hole, conduit means connected to said hood, a filter, a suction fan for drawing at least a part of said dust-laden air ascending up the drill hole from said hood to said filter through said conduit means, the improving comprising said filter being in the form of a filter web, said filter web being interposed in the path of air flow through said conduit means from its inlet from said hood to an exhaust, and means for driving said filter web at a speed which is proportional to the drilling rate.

3. An improved machine as claimed in claim 2 comprising a separator means inserted in said conduit means between said hood and said filter for removing coarse particles from the flow of air escaping from said drill hole during the drilling operation prior to passage through said filter.

4. The method as set forth in claim 1 further including the step of performing an initial removal of at least a portion of the coarser drill cuttings from the collected air prior to passing the collected air through the filter web.

* * * * *